(12) United States Patent
Schmidt et al.

(10) Patent No.: US 8,251,210 B2
(45) Date of Patent: Aug. 28, 2012

(54) CASE FOR AN ELECTRONIC DEVICE WITH A RESILIENT BAND FOR HOLDING ITEMS

(75) Inventors: Michael Schmidt, Chicago, IL (US);
Taiwon Choi, Glenview, IL (US);
Eugene Lee, Chicago, IL (US)

(73) Assignee: Fellowes, Inc., Itasca, IL (US)

( * ) Notice: Subject to any disclaimer, the term of this patent is extended or adjusted under 35 U.S.C. 154(b) by 0 days.

(21) Appl. No.: 12/984,309

(22) Filed: Jan. 4, 2011

(65) Prior Publication Data

US 2012/0168336 A1    Jul. 5, 2012

(51) Int. Cl.
*B65D 85/00* (2006.01)
(52) U.S. Cl. .......................... 206/320; 206/38; 455/575.8
(58) Field of Classification Search .................. 206/320, 206/38, 305, 701; 455/575.8; 224/929, 930; 361/679.01
See application file for complete search history.

(56) References Cited

U.S. PATENT DOCUMENTS

| | | | | |
|---|---|---|---|---|
| 5,285,939 | A * | 2/1994 | Hogan | 224/250 |
| 6,626,362 | B1 * | 9/2003 | Steiner et al. | 235/462.45 |
| 6,785,566 | B1 * | 8/2004 | Irizarry | 455/575.8 |
| 7,230,823 | B2 * | 6/2007 | Richardson et al. | 361/679.25 |
| 7,648,027 | B2 * | 1/2010 | Lin et al. | 206/320 |
| 8,016,107 | B2 * | 9/2011 | Emsky | 206/320 |
| 8,047,364 | B2 | 11/2011 | Longinotti-Buitoni | |
| 2008/0017678 | A1 * | 1/2008 | Anderson et al. | 224/221 |
| 2009/0194444 | A1 * | 8/2009 | Jones | 206/320 |
| 2010/0224519 | A1 * | 9/2010 | Kao | 206/320 |
| 2011/0034221 | A1 * | 2/2011 | Hung et al. | 455/575.8 |
| 2011/0136555 | A1 * | 6/2011 | Ramies et al. | 455/575.8 |
| 2011/0217946 | A1 * | 9/2011 | DeAngeles | 455/347 |
| 2011/0253569 | A1 * | 10/2011 | Lord | 206/320 |
| 2011/0267748 | A1 * | 11/2011 | Lane et al. | 361/679.01 |

OTHER PUBLICATIONS

The Callet product listing, description and press releases, found at url: <http://www.thecallet.com>.
CocoPerez.com, Tech Talk, Introducing: The Callet, Jun. 23, 2010, found at url: <http://cocoperez.com/2010-06-23-introducing-the-callet>.
The Callet on the Today Show, Jun. 17, 2010, found at url: <http://www.youtube.com/watch?v=_NvMzYA5_9w>.
ShoppingBlog.com, Via Chic Report, The Callet Combines Wallet With Phone Case, Jul. 9, 2010, found at: <http://www.shoppingblog.com/blog/7091016>.

* cited by examiner

*Primary Examiner* — Steven A. Reynolds
(74) *Attorney, Agent, or Firm* — Pillsbury Winthrop Shaw Pittman LLP

(57) ABSTRACT

Disclosed is a case or attachment device for use with an electronic device having a screen. The case has a base portion with a body having a back wall and side walls extending therefrom forming a receiving opening for receiving the electronic device. The case also includes a resilient band configured to hold one or more items (e.g., ID, credit cards, cash) against the case. The band may be pulled away from the body and items may be slid underneath the band so that they are held between an inner surface of the band and an outer surface of the body. The band may extend in a lateral, a longitudinal, or a diagonal direction. The band may also form a pocket for receiving items therein. The band can hold items against the back wall of the case.

25 Claims, 8 Drawing Sheets

CASE FOR AN ELECTRONIC DEVICE WITH A RESILIENT BAND FOR HOLDING ITEMS

BACKGROUND OF THE INVENTION

1. Field of Invention

The present invention is generally related to a case for use with an electronic device having a screen. More specifically, the invention relates to a resilient band configured to hold items (e.g., identification, credit card(s), cash, etc.) against the case.

2. Background

Some cases for portable, electronic devices, such as cellular phones and personal digital assistants (PDAs), for example, are large and bulky in a user's pocket. In addition, many users tend to carry an electronic device in addition to a carrying device for personal items (e.g., a wallet or clip). Such users tend to carry multiple items in their pockets, which can be bulky, inconvenient, and/or uncomfortable.

SUMMARY OF THE INVENTION

One aspect of the invention provides a case for use with an electronic device having a screen. The case includes: a base with a body having a back wall and side walls extending therefrom forming a receiving opening for receiving the electronic device; and a resilient band configured to hold one or more items against the case.

Another aspect of the invention provides an attachment device for a portable electronic device having a screen. The attachment device includes: a base with a body having a back wall and side walls extending therefrom forming a receiving opening for receiving the electronic device; a top having at least a front wall that is configured to releasably lock with the base to encapsulate the electronic device therein; and a resilient band configured to hold one or more items against the body.

Other features and advantages of the present invention will become apparent from the following detailed description, the accompanying drawings, and the appended claims.

DETAILED DESCRIPTION OF THE ILLUSTRATED EMBODIMENT(S) OF THE INVENTION

FIGS. 1-6 illustrate a front, a right side, a back, a left side, a bottom (or a top), and a transverse sectional view, respectively, of a case 10 in accordance with an embodiment of the present invention. The case 10 comprises a base 12 and a resilient band 14. Case 10 is a detachable device and may be used for carrying an electronic device. Generally, case 10 may be formed using processes such as injection molding. In an embodiment, case 10 is preferably injection-molded plastic. As will become further evident, resilient band 14 is configured to hold one or more items 104 against case 10. The one or more items may include, but are not limited to, credit card(s), identification card(s) (e.g., license), or other similar cards (e.g., rewards cards), key(s), and/or currency. Besides personal items, items 104 held by the case 10 may also include devices that may be used with the electronic device 100, such as an earpiece (e.g., Bluetooth®-enabled), ear buds or headphones, computer chips, memory cards, and the like.

Base 12 is designed to receive an electronic device 100 (e.g., see FIG. 1) such as a cellular phone, PDA, music player (e.g., MP3 player), tablet, gaming device, and the like, that has a screen 104 for displaying or viewing. Base 12 comprises a body 20 with a receiving opening 22 for receiving the electronic device 100. Body 20 may comprise a back wall 24 and one or more side walls 26 that extend from back wall 24 to form receiving opening 22. The back wall 24 has back or outer surface 25 and an inside or inner surface 27. In some embodiments, the back wall 24 may have one or more openings 32 that correspond to features of an electronic device. For example, an electronic device may have a camera associated therewith. In some embodiments, the opening(s) 32 in the back wall 24 may correspond to a placement of a lens and/or flash device of the associated camera.

Figure 7:
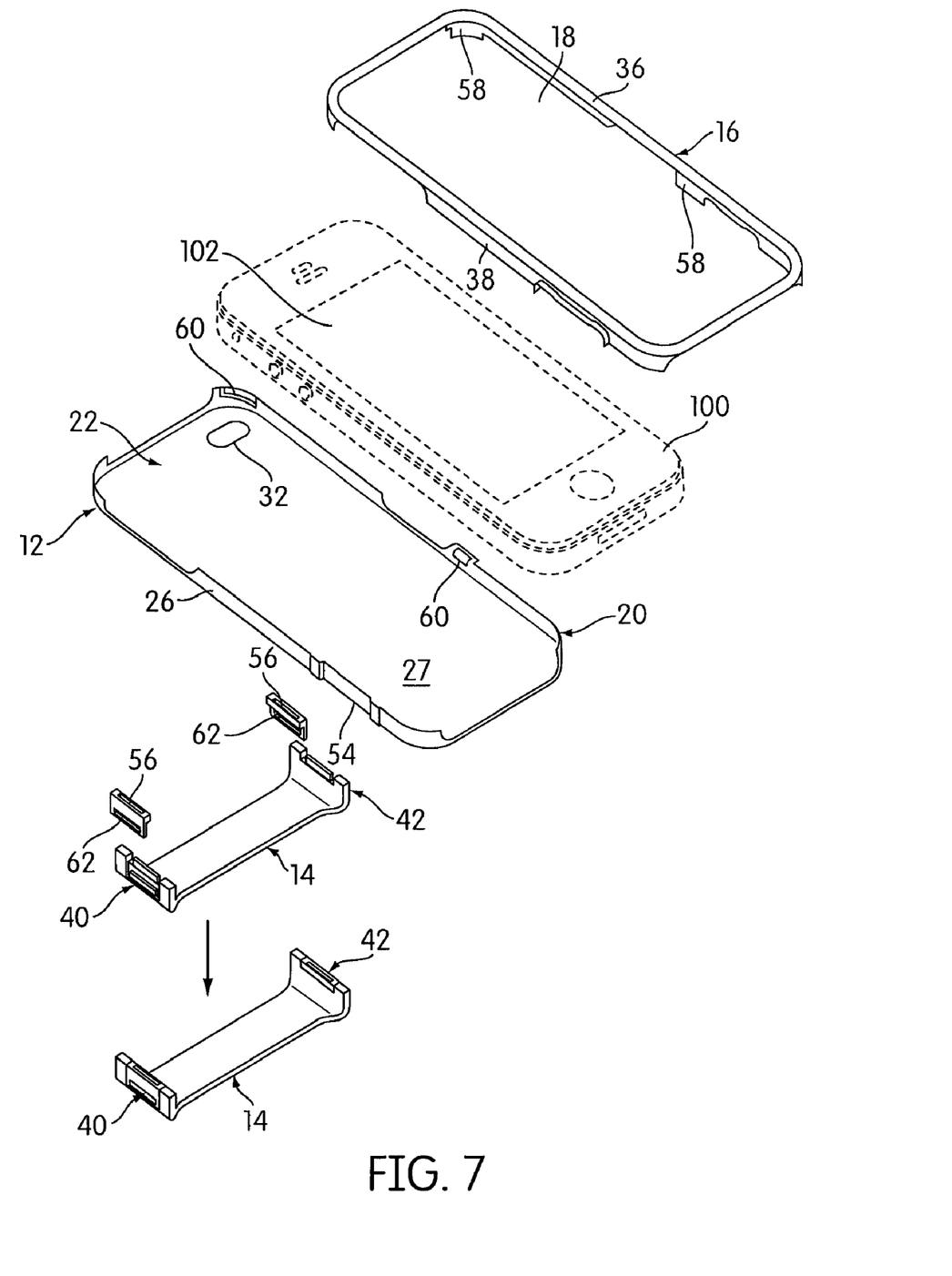
FIG. 7 illustrates an exploded plan view of the case of FIGS. 1-6.

The one or more side walls 26 of the base 12 may comprise one or more edges. In some embodiments, the edge(s) of one or more side walls 26 comprises a lip for removably grasping a front of the electronic device 100 when the device is inserted therein. Alternatively, in other embodiments, the case 10 further comprises a top 16 configured to releasably lock with the base 12 to encapsulate the electronic device 100 therein (e.g., see FIGS. 7 and 8). For example, in an embodiment, the top 16 comprises at least a front wall 36 with at least an opening 18. The at least one opening 18 enables viewing of the screen 104 of the electronic device 100. Additionally and/or alternatively, it is within the scope of this disclosure that two or more openings may be provided in the top 16. For example, a first opening may enable viewing of the screen and a second and/or a third opening may enable access to one or more keys or buttons. In an embodiment, the top 16 may also comprise one or more side walls 38 that extend from the front wall 36. The one or more side walls 38 may comprise one or more edges. In some embodiments, the edges of side walls 38 of top 16 may be configured to releasably lock with the edges of side walls 26 of base 12 to surround and capture the electronic device 100 within the case 10.

In some embodiments, the base 12 and top 16 may have corresponding connection members extending from their respective walls 24 or 36, or extending from their respective side walls 26 or 38. For example, side walls 26 of the base 12 may include female connectors 60 and side walls 38 of the top 16 may include male connectors 58, and the female connectors 60 may be configured to receive the male connectors 58 therein when the top 16 and base 12 are connected together. In other embodiments, the base 12 may include male connectors and the top 16 may include female connectors. However, the type of connection members used for connecting top 16 and base 12 to each other should not be limiting.

Figure 5:
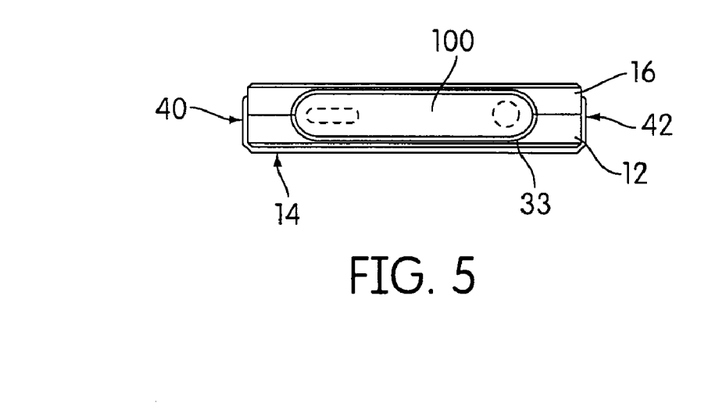
Figure 6:
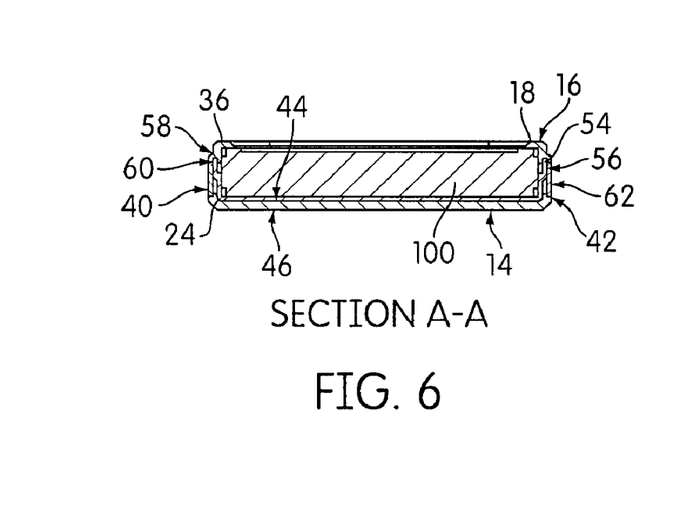

In some embodiments, one or more of the one or more side walls 26 may have one or more openings 34 that correspond to features of an electronic device. For example, an electronic device may have button(s), key(s), slot(s), or port(s) on its sides. In some embodiments, the opening(s) 34 in the one or more side walls 26 may correspond to a placement of such button(s), key(s), slot(s), or port(s) (e.g., see FIG. 4). Additionally and/or alternatively, in some embodiments, one or more openings 33 may be provided at a top area 28 and/or a bottom area 30 of the case 10. In an embodiment, the opening (s) 33 may be formed within side walls 26 or 38. In another embodiment, the opening(s) 33 may be formed by a connection of the top 16 with the body 12 (i.e., each portion includes a part of the opening). FIG. 5 illustrates an example of an opening 33 in a bottom area 30 of the case 10 with the electronic device 100 therein.

Dimensions of the one or more side walls 26 and/or 38 may vary according to the type of electronic device to be held in the case 10. For example, in some embodiments, a side wall 26 and/or 38 may be an elongate side wall that extends substantially in the longitudinal direction of the case 10. Side wall 26 and/or 38 may be of substantially similar length as its relative back wall 24 or front wall 36. In some embodiments, one or more side walls may be or may incorporate edge(s) formed in an area corresponding to edge(s) of the electronic device. Such edge(s) may be formed with an elongate side wall, or without. Edge(s) may be rounded or rectangular, for example.

Generally, the one or more side walls 26 and/or 38 may comprise any dimension and may be provided in areas that allow for insertion and capturing of the electronic device in the receiving opening 22. It should be understood that while the illustrated embodiment shows a limited number of openings, e.g., openings 32 and 34 within its back and side walls 24, 26, any number of openings may be formed or provided therein, and the placement of such openings is not limited. Such openings, including openings 18, 32 and 34, may be shaped to provide access to a feature of the electronic device. However, such shapes are also not limiting. Furthermore, although specifically not shown in the FIGS., in some embodiments, base 12 may comprise an enclosing top wall and/or a bottom wall (at top area 28 or bottom area 30 of case).

An electronic device may be inserted into the base 12 such that its back is positioned adjacent or against inner surface 27 of the back wall 24 and its sides positioned adjacent or against inner surface(s) of the one or more side walls 26. The electronic device may be secured within the receiving opening 22 by attaching top 16 to base 12. For example, the top 16 and base 12 may be aligned and snapped together (e.g. using connection members such as connectors 58 and 60). In other embodiments, the electronic device may be secured within receiving opening 22 via a friction-fit or snap-fit, for example. In some embodiments, the outward edge(s) of the side walls 26 may assist in retaining the electronic device in the case 10. The base 12 (and top 16) also allows a user to remove the electronic device from the case 10.

The resilient band 14 comprises a thin, flat strip of material and is configured to hold one or more items against the case 10. FIGS. 1-7, FIG. 8, and FIGS. 9-10 illustrate alternative embodiments within the scope of this disclosure incorporating a resilient band 14 with case 10. In some embodiments, the resilient band 14 is attached to the body 20 of base 12.

Figure 1:
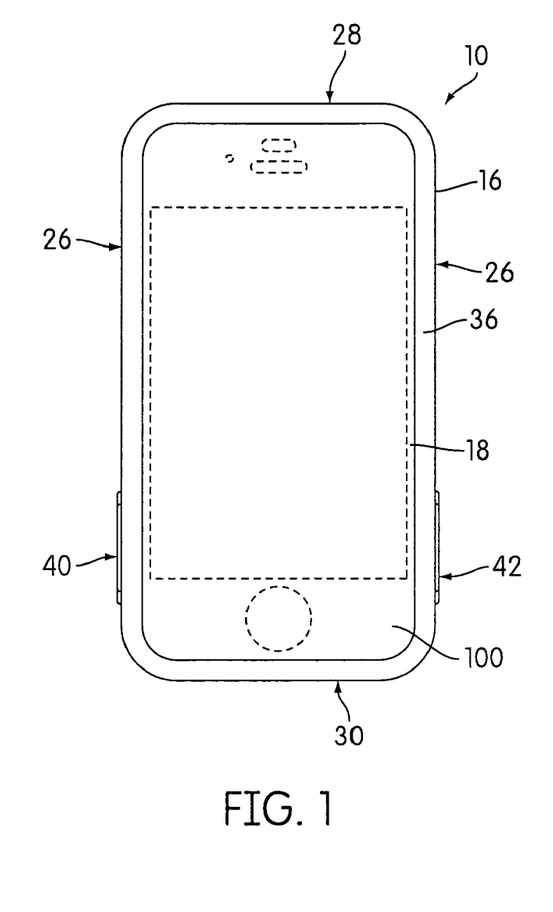
FIGS. 1-6 illustrate a front, a right side, a back, a left side, a bottom (or a top), and a transverse sectional view, respectively, of a case in accordance with an embodiment of the present invention.
Figure 2:
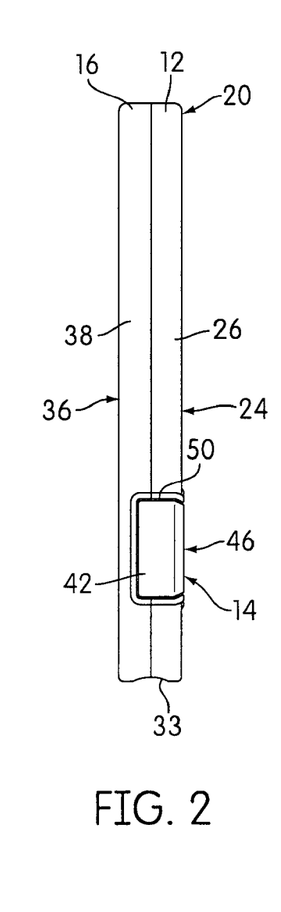
Figure 3:
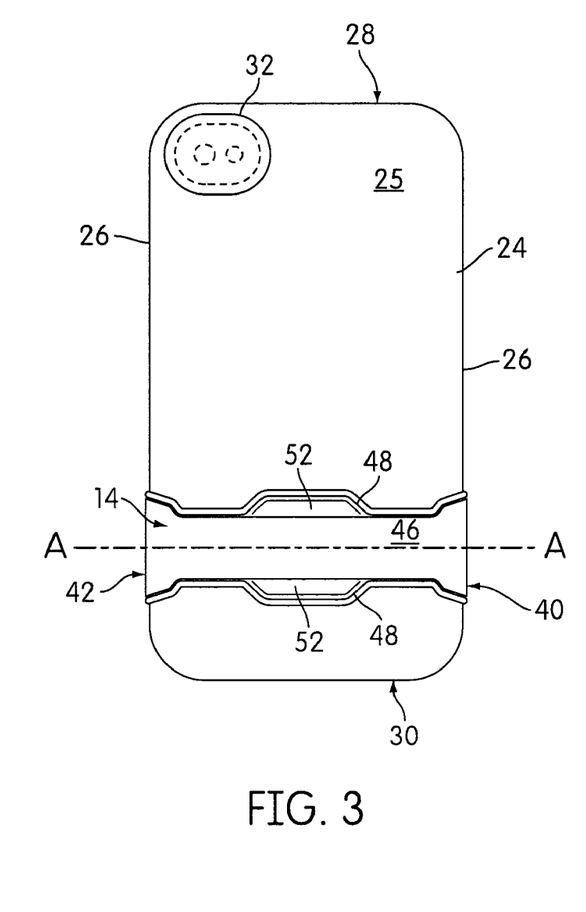
Figure 4:
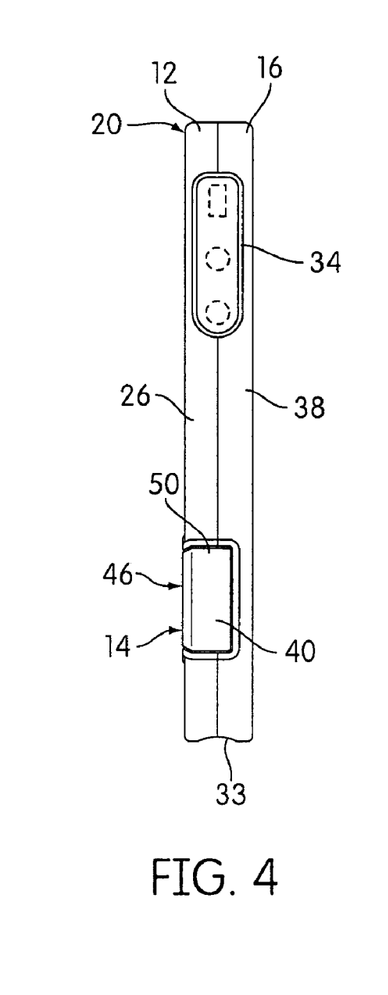
Figure 9:
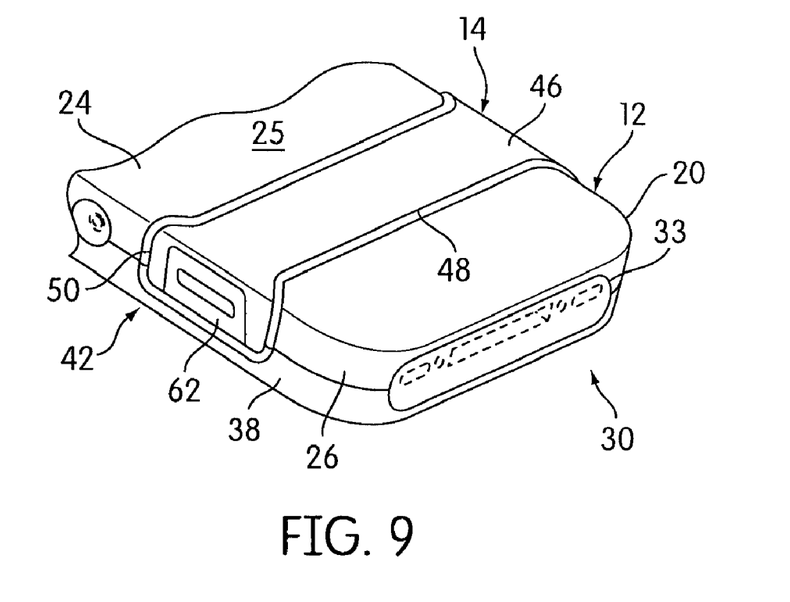
FIG. 9 illustrates a partial back plan view of a case with a band in accordance with yet another embodiment of the present invention.
Figure 10:
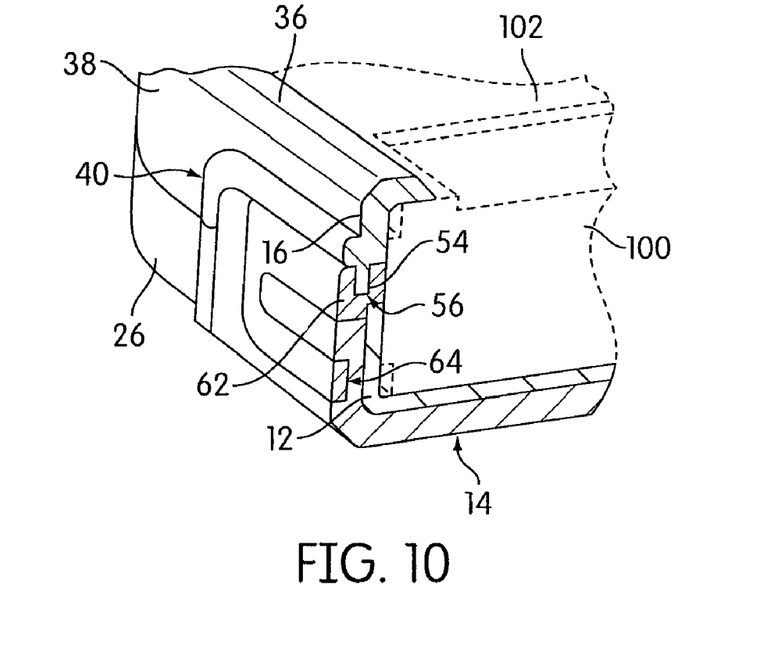
FIG. 10 illustrates a detailed plan view of case and band of FIG. 9.
Figure 11:
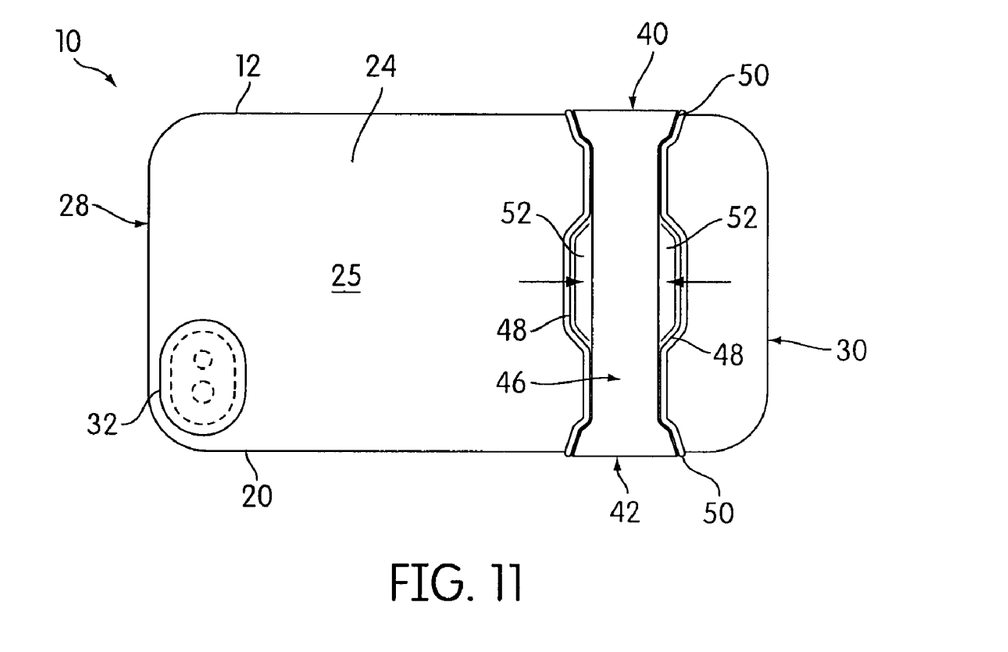
FIG. 11 illustrates a back perspective view of the case of FIGS. 1-6.

The resilient band 14 comprises an elongate body with a first end 40 and a second end 42, and an inner surface 44 and an outer surface 46. In some embodiments, each end 40 and 42 of resilient band 14 may be connected to one relative side wall 26 of body 20 such that the elongate body of the band 14 extends adjacent to the back wall 24 of the body 20. The body 20 comprises a length (in a longitudinal direction) and a width (in a lateral direction). In embodiments, the resilient band 14 is attached such that it extends the width of the case 10 and/or body 20 in a lateral direction. In an embodiment, the resilient band 14 extends and is positioned adjacent to the back wall 24 of the body 20. Specifically, the inner surface 44 of the resilient band 14 may be constructed and arranged to lie adjacent or substantially flat against the outer surface 25 of the back wall 24 of body 20, as shown in FIGS. 3, 9, and 11, for example (e.g., when item(s) 104 are not being held). The elongate body of the resilient band 14 may be stretched when ends 40 and 42 are attached to their respective side walls/ connection areas (further described below), causing slight deformation of the band 14. The slight deformation of the band 14 assists in keeping the elongate body taught against or adjacent the back wall 24 of case 10, while still providing the flexibility to pull the resilient band 14 away from the case 10 (e.g., to slide items underneath it). In accordance with an embodiment, as shown and described with reference to FIG. 12, one or more item(s) 104 are configured to be held between the inner surface 44 of the resilient band 14 and the outer surface 25 of the back wall 24 of body 20.

In other embodiments, it is envisioned that the band may be positioned and attached to the body 20 to extend the length of the body or case in a longitudinal direction, or extend in a diagonal direction with respect to the case. Exemplary designs of a case in accordance with alternate embodiments of the present invention are shown and described below with reference to FIGS. 14, 15, and 16.

In some embodiments, the outer surface 25 of the back wall 24 of body 20 comprises an indentation 48 configured to receive a portion of the resilient band 14 therein. For example, at least a portion of the elongate body of band 14 may be configured to be seated within indentation 48 when the inner surface 44 of the band 14 lies adjacent or is against the outer surface 25 of back wall 24 of body 20. In additional or alternative embodiments, side walls 26 may have side indentations 50 for receiving first and second ends 40 and 42 therein. For example, when first and second ends 40, 42 are connected to the side wall 26, they may be attached or secured within a respective indentation 50. Indentation features such as indentations 48 and/or 50 may substantially reduce and/or substantially eliminate a differential in thickness or height between the outer surface 25 of back wall 24 and outer surface 46 of resilient band 14. For example, the planes at which the outer surfaces 25 and 46 extend may be adjacent each other. In some embodiments, the outer surface 46 of resilient band 14 is constructed and arranged to lie substantially flush with outer surface 25 of the back wall 24 of base 12 (i.e., the outer surfaces 46 and 25 are substantially within the same plane).

As shown in FIGS. 3 and 11, for example, a recessed grasp area 52 may be provided adjacent resilient band 14 in accordance with some embodiments. Recessed grasp area 52 may assist a user in grasping and moving (lifting) resilient band 14 so that items 104 may be placed relative to and held by band 14 (i.e., between the band 14 and back wall 24). For example, a user may be able to grasp with his/her fingers sides and/or a portion of the elongate body of band and move (lift) the inner surface 44 of band 14 away from the outer surface 25 of back wall 25. The grasp area 52 may comprise a recess, indent, or access area in back wall 24 of body 20. In an embodiment, grasp area 52 may be connected to or extend from indentation 48 in back wall 24.

The shape of indentations 48 and/or 50 and recessed grasp area 52 of back wall 24 may be determined based on a shape of a corresponding area of resilient band 14. For example, the shape of the indentation 48 may correspond to a shape of the elongate body of resilient band 14. Similarly, the shape of side indentations 50 may correspond to a shape of the first and second ends 40 and 42. Recessed grasp area 52 may be formed of a shape that is larger and/or extends from a shape of the elongate body of resilient band 14. The shapes and positioning of such features, however, should not be limiting.

Any number of methods and devices may be used to attach resilient band 14 to case 10. In the herein described, non-limiting embodiment, the ends 40 and 42 are configured to connect to a part of the case 10 using corresponding connection members. For example, in some embodiments, the side walls 26 comprise male protrusion members 54 and the first and second ends 40, 42 of the resilient band 14 comprise female receiving members 56. The female receiving members 56 of the band are attached to the male protrusion members 54 of the side walls 26 of the body 20. For example, in accordance with an embodiment, the ends 40 and 42 may comprise a slot as its female receiving member 56. Each slot 56 may be placed over male protrusion members 54 on the case 10.

In other embodiments, ends 40, 42 of the resilient band may comprise male protrusion members, while the case 10 (e.g., body 20) comprises female receiving members. The connection of resilient band 14 to the body 20 should not be limiting. Any size, shape, and/or configuration may be used for the connection members.

Figure 8:
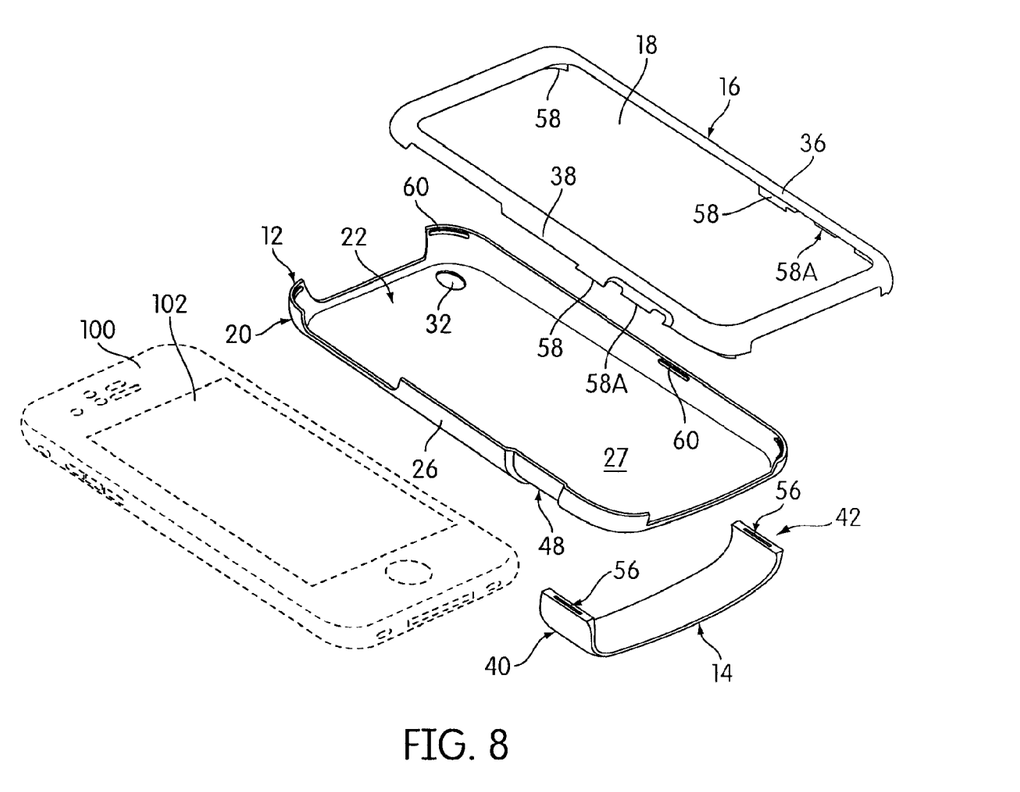
FIG. 8 illustrates an exploded plan view of a case with a band in accordance with another embodiment of the present invention.

In other embodiments, the resilient band 14 may further include attachment areas for receiving a part of top 16. For example, as shown in FIG. 8, resilient band 14 may be attached within an indentation 48 of base via a snap-fit, adhesive, or other alternative connection. Additionally, ends 40 and 42 of band 14 may include female receiving members 56. The female receiving members 56 may be positioned to receive male portions 58*a* that extend from the side walls 38 (or front wall 36) of top 16. When the top 16 and base 12 are connected together (e.g., using male connecting portions 58 of top 16 and female connection portions 60 of base 12), the male portions 58*a* of top 16 may also be inserted and connected to female receiving members 56 of band 14.

In yet another embodiment, the resilient band 14 may be attached to case 10 using adhesives, bonds, or other processes. Accordingly, the connection of resilient band 14 to any part of case 10 should not be limiting.

The materials used to form resilient band 14 should not be limiting. The resilient band may be formed from any number of resilient materials, i.e., materials that can substantially return to its original form or portion after being stretched, moved, bent, etc. In some embodiments, the elongate body may be formed from a thermoplastic polymer material, such as thermoplastic polyethylene (TPE). In an embodiment, the body may be formed from 45 degree TPE.

In some embodiments, the resilient band 14 comprises one or more reinforcement material(s). For example, as shown in the non-limiting embodiment of FIG. 7, the first and second ends 40 and 42 may be reinforced with one or more materials. For example, in an embodiment, a reinforcement material portion 62 may be formed for insertion/attachment to each end 40, 42. The use and method of manufacturing the ends 40, 42 and/or the resilient band 14 with reinforcement material(s) should not be limiting. In an embodiment, the portions 62 and band 14 may be formed (e.g., molded) separately and attached together. In an embodiment, the ends 40 and 42 and reinforcement material portion 62 may be formed using an overmolding process. In the illustrated embodiment of FIG. 10, for example, the ends 40 and 42 (end 40 only being shown), may be formed with a receiving area 64 for receiving reinforcement material portion 62. In another embodiment, the portions 62 and band 14 may be molded successively and/or simultaneously. Also, the reinforcement material 62 may comprise any number of materials and should not be limiting. In an embodiment, the reinforcement material may be formed from a hard polymer material, such as polypropylene (PP). Further, the shapes and/or configurations of any of the ends 40 and 42, reinforcement material portion 62, and/or receiving area 64 should not be limiting.

In yet another embodiment, it should be understood by one of ordinary skill in the art that substantially both ends 40 and 42 may be formed from a material that is different than a material used to form elongate body of resilient band 14. For example, the ends 40 and 42 may be formed from a material that is not substantially resilient, while the body of the band 14 is formed from a material that is substantially resilient. Accordingly, the materials and methods for forming ends and body of resilient band 14 should not be limiting.

In an embodiment, the reinforcement material portions 62 provided at either end 40 and 42 may comprise a connection member for the band 14, such as female receiving members 56, for connecting to the base 12 and/or top 16. For example, as shown in FIG. 9 and in greater detail in FIG. 10, the reinforcement material portions of the ends (in this case, first end 40 is shown) may include the female receiving members 56 (e.g., slots) for the band 14. The male protrusion members 54 may be extend from the side walls 38 of the top portion 16 and into the female receiving members 56 when the top 16 and base 12 are connected.

Figure 12:
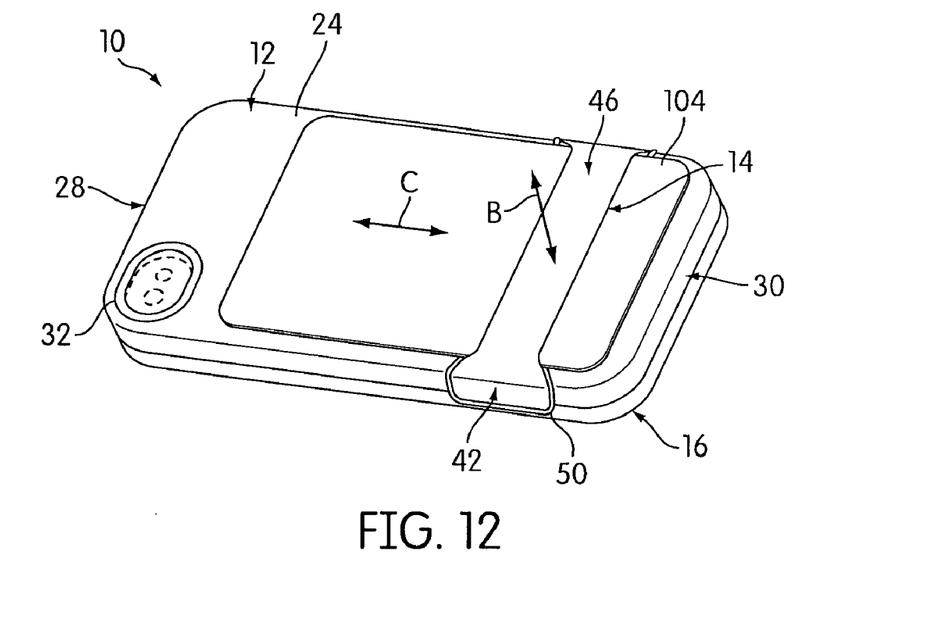
FIG. 12 illustrates a back perspective view of the case of FIGS. 1-6 with the band in use holding an item.

FIG. 12 illustrates a back perspective view of the case 10 of FIGS. 1-6 with an electronic device 100 therein (only partially shown) and an item 104 (e.g., card) attached thereto. As noted above, electronic device 100 may comprise known, portable devices such as a cellular (cell) phone, PDA, MP3 player, tablet, gaming device, etc. To insert and attach the card item 104 for holding by the case 10, the user can use one or more fingers to grasp the body of resilient band 14 adjacent the grasp area 52 (see FIG. 11). The user can position one or more fingers underneath the resilient band 14 (adjacent the inner surface 44), if desired. The resilient band 14 is lifted in a direction perpendicular to a plane at which the back wall 24 lies (e.g., see arrow B), such that the inner surface 24 of the band 14 is moved away from a position adjacent to or lying against the back wall 24 of body 20. The flexibility of the band 14 allows it to be held away from the back wall 24 (e.g., by a user's fingers) so that the card item 104 can be inserted or slid and positioned underneath the resilient band 14 in a longitudinal direction (e.g., see arrow C). Once the card item 104 (and/or other alternate items) is positioned at least partially underneath the resilient band 14, the user releases the elongate body from his/her grasp and the resiliency of the resilient band 14 causes it to move towards the back wall 24 to grasp the item 104 therebetween.

To remove one or more items 104, the item(s) 104 may be slid in a longitudinal direction (see arrow C) relative to base 12 and from underneath band 14. Additionally and/or alternatively, a user may lift band 14 away from the item(s) 104 and back wall 24 of the body 20 before or during movement of the item(s) in the longitudinal direction.

Figure 13:
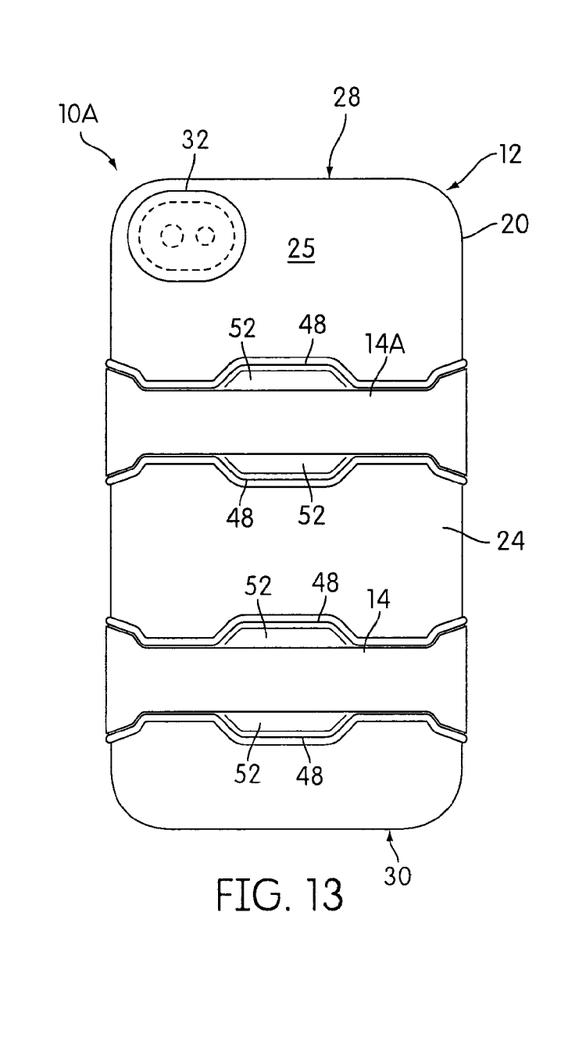
FIG. 13 illustrates a back view of a case with bands in accordance with yet another embodiment of the present invention.

In accordance with another embodiment, such as shown in FIG. 13, two or more resilient bands 14 and 14A may be provided on case 10A. For example, as shown, two bands 14 and 14A may be provided adjacent back wall 24 of base 12. In one embodiment, bands 14 and 14A are attached in a lateral direction to extend a width of the case 10A. However, each band 14 and 14A may be positioned to extend in a longitudinal or diagonal direction. In another embodiment (not shown), one band may be provided adjacent a back wall 24 while the other is provided adjacent the front wall 36. The number of resilient bands 14 used on case 10A and their position and/or configuration should not be limiting.

Figure 14:
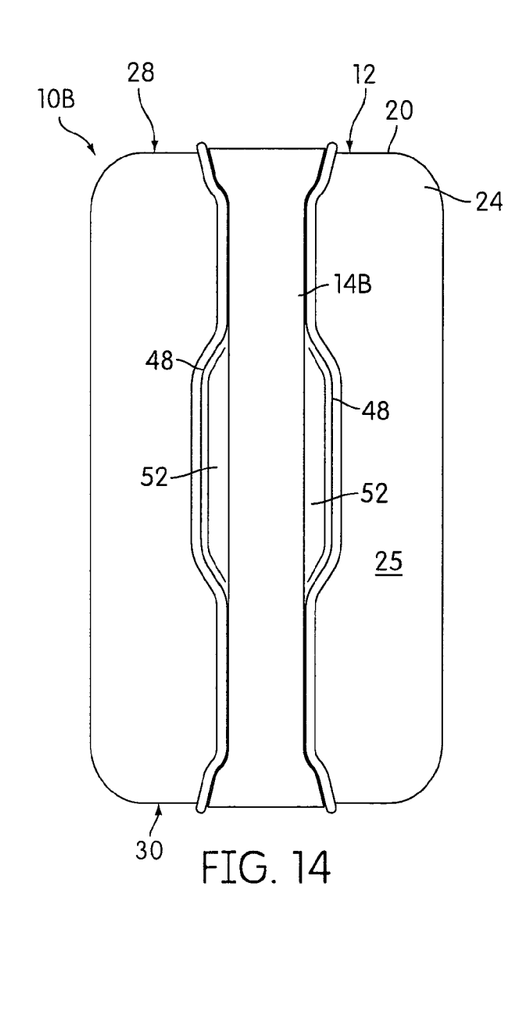
FIGS. 14, 15, and 16 illustrate alternate designs of a case in accordance with alternate embodiments of the present invention.

As previously noted, a resilient band 14B may alternatively be positioned in a longitudinal direction to extend the length of a case 10B, as illustrated in FIG. 14. In embodiments, the resilient band 14B is attached such that it extends the length of the case 10B and/or its body 20 in a longitudinal direction. In an embodiment, the resilient band 14B extends and is positioned adjacent to the back wall 24 of the body 20. The inner surface of the resilient band 14B may be constructed and arranged to lie adjacent or substantially flat against the outer surface 25 of the back wall 24 of body 20. The elongate body of the resilient band 14B may be stretched and ends 40 and 42 are attached to their respective top and bottom walls/connection areas, causing slight deformation of the band 14B. The slight deformation of the band 14B assists in keeping the elongate body taught against or adjacent the back wall 24 of case 10B, while still providing the flexibility to pull the resilient band 14B away from the case 10B (e.g., to slide items underneath it). One or more item(s) 104 are configured to be held between the inner surface of the resilient band 14B and the outer surface 25 of the back wall 24 of body 20.

Figure 15:
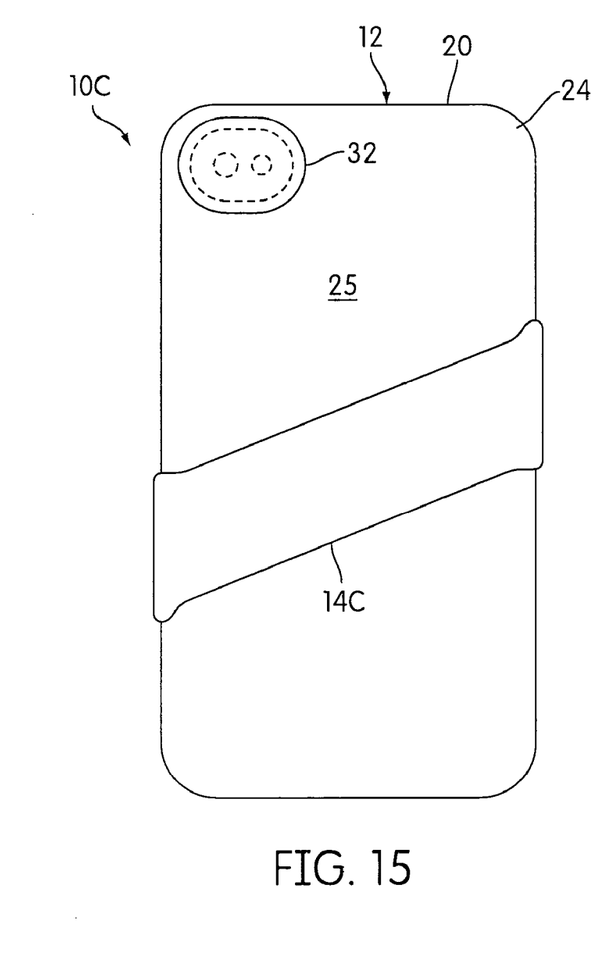

In another embodiment, a resilient band 14C may be positioned in a diagonal direction with respect to a case 10C, as illustrated in FIG. 15. In embodiments, the resilient band 14C is attached such that it extends at an angle across the case 10C and/or its body 20 in a diagonal direction. In some embodiments, the resilient band 14C extends and is positioned adjacent to the back wall 24 of the body 20. The inner surface of the resilient band 14C may be constructed and arranged to lie adjacent or substantially flat against the outer surface 25 of the back wall 24 of body 20. In some embodiments, the elongate body of the resilient band 14C may be stretched and ends 40 and 42 attached to respective side walls/connection areas. In other embodiments, the ends 40 and 42 may be attached adjacent to respective top and bottom corners of the case 10C. In yet other embodiments, the ends 40 and 42 may be attached to respective top and bottom areas 20 and 30 at an angle. The attachment of the ends 40 and 42 at an angle causes slight deformation of the band 14C. The slight deformation of the band 14C assists in keeping the elongate body taught against or adjacent the back wall 24 of case 10C, while still providing the flexibility to pull the resilient band 14C away from the case 10C (e.g., to slide items underneath it). One or more item(s) 104 are configured to be held between the inner surface of the resilient band 14C and the outer surface 25 of the back wall 24 of body 20.

In such embodiments (as shown in FIGS. 13-15), it should be understood by one of skill in the art that a user would lift and position one or more item(s) in a corresponding yet opposite manner as described above. For example, to attach item(s) to the case, the user would lift the band and move/slide one or more items underneath the band in a lateral direction relative to the body.

It should be noted that the step-by-step individual movement of resilient band 14 with respect to body 20 of base 12 is provided for illustrative purposes only. It is to be understood that an item 104 itself may be used to move (lift) resilient band 14 relative to the body 20 and that the item 104 may be slid underneath the band 14 without a user using both hands for lifting and positioning the item. For example, a user may hold the case 10 in one hand while sliding the item 104 underneath the resilient band 14 (or within pocket).

Figure 16:
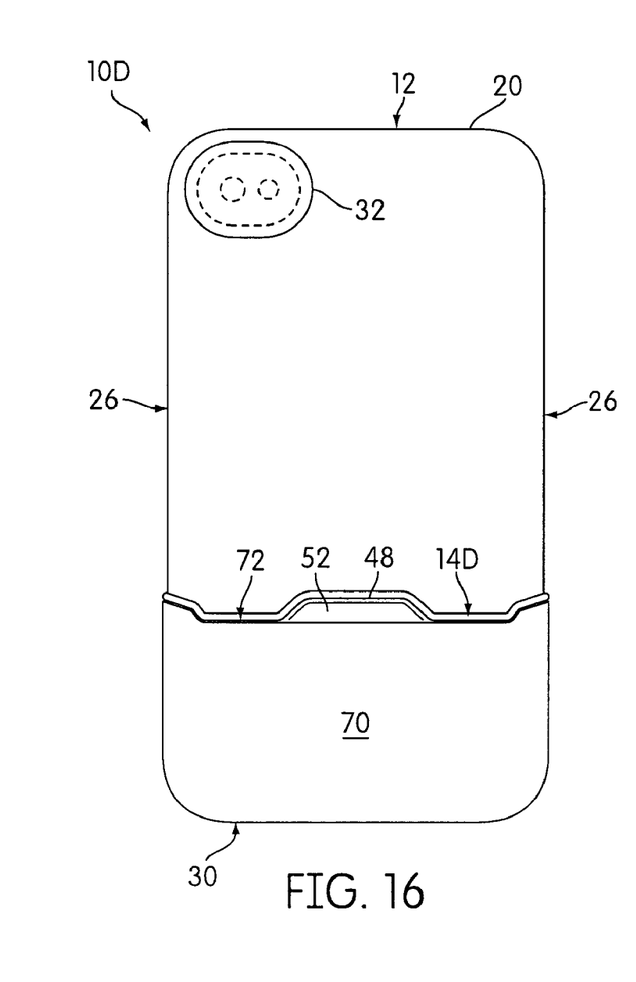

FIG. 16 illustrates yet another embodiment, wherein a case 10D comprises a resilient band 14D having a body portion 70 extending at least partially along the case 10D. For example, in some embodiments, the body portion 70 extends adjacent to the back wall 24 of the body 20. Ends of the body portion 70 may be connected to bottom area 30 and sides 26 of the base 12, while one end 72 remains unconnected or free. The body portion 70 has an inner surface constructed and arranged to move towards and away from outer surface 25 of back wall 24. The free end 72 and at least part of the inner surface of body portion 70 may be movable towards and away from the outer surface 25 of the back wall 24, thereby forming a pocket to receive and hold one or more items against the case 10D.

The above embodiments of case 10 (and/or cases 10A-10D as shown in FIGS. 13-16) allow for a dual function in that a user may use the case 10 to carry the electronic device and to carry one or more personal items 104. The case 10 can also protect the electronic device from scratches, for example. The case 10 may be held by the user in any number of planes. Generally, the disclosed design of case 10 is slim and there is little to no additional bulk or weight added to the case (whether the resilient band 14 is or is not being utilized). The illustrated embodiments, however, are not meant or intended to be limiting.

For example, the resilient bands 14, 14A, 14B, 14C, and 14D as disclosed herein should not be limited to being positioned relative to the back wall 24 of the case. In accordance with an embodiment, one or more of the resilient bands 14-14D may be positioned adjacent a front wall 36 of the case and/or a screen 104 of the electronic device 100. In accordance with another embodiment, a resilient band may be formed such that its body extends around the entire case, i.e., adjacent both back wall of the case and front wall/screen. One or more items 104 may be held against the back wall or front wall/screen of the case, thereby providing two areas for holding.

Also, it should be noted that the attachment of the resilient band 14 should not be limited. For example, although in one embodiment it has been shown and described that ends 40 and 42 of resilient band 14 may be attached to the sides of the case 10, it should be understood that ends 40 and 42 may be attached to any number of surfaces of the case 10, including, but not limited to, back wall 24 and front wall 36. Moreover, the embodiment as shown in FIG. 16, i.e., wherein the resilient band 14 comprises a body portion 70 forming a pocket, should also not be limiting. That is, parts of body portion 70 may be attached to alternate parts of the case 10 (such as back wall 24) and need not specifically be attached to a bottom and sides of the body 20.

Moreover, it should be understood that both a top 16 and a base 12 need not be provided to form case 10. For example, it is envisioned to be within the scope of this disclosure that base and top are formed as a single, flexible structure that which an electronic device 100 may be inserted therein.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles.

Therefore, this invention includes all modifications encompassed within the spirit and scope of the following claims.

What is claimed is:

1. A case for use with an electronic device having a screen, the case comprising:
   a base comprising a body having a back wall and side walls extending therefrom forming a receiving opening for receiving the electronic device; and
   a resilient band configured to hold one or more items against the case, the resilient band being attached to the body and configured to hold one or more items against the body,
   wherein the resilient band has a first end and a second end, each end comprising a reinforcement portion therein comprising a material that is different from a material of the first and second ends of the resilient band, and wherein each end is connected to one relative side wall of the body such that the band extends adjacent to the back wall of the body, and
   wherein the side walls comprise male protrusion members and wherein the first and second ends of the resilient band comprise female receiving members, and wherein the female receiving members of the first and second ends of the resilient band are attached to the male protrusion members of the side walls of the body.

2. The case according to claim 1, further comprising a top having at least a front wall with at least one opening that is configured to releasably lock with the base to encapsulate the electronic device therein, and wherein the at least one opening enables viewing of the screen.

3. The case according to claim 2, wherein the resilient band is attached to the top.

4. The case according to claim 1, wherein the body comprises a length and a width, and wherein the resilient band is attached such that it extends the width of the body in a lateral direction.

5. The case according to claim 1, wherein the body comprises a length and a width, and wherein the resilient band is attached such that it extends the length of the body in a longitudinal direction.

6. The case according to claim 1, wherein the resilient band is attached such that it extends in a diagonal direction with respect to the body.

7. The case according to claim 1, wherein the resilient band extends adjacent to the back wall of the body.

8. The case according to claim 1, wherein the resilient band further comprises an inner surface and an outer surface, and wherein the inner surface of the resilient band is constructed and arranged to lie adjacent an outer surface of the back wall, and wherein surface of the back wall.

9. The case according to claim 8, wherein the outer surface of the back wall of the body comprises an indentation configured to receive the resilient band therein.

10. The case according to claim 9, wherein the indentation is configured such that the outer surface of the resilient band is constructed and arranged to lie substantially flush with the outer surface of the back wall of the base.

11. The case according to claim 8, further comprising a recessed grasp area provided adjacent the resilient band to enable access to grasp the resilient band for movement of the inner surface of the band away from the outer surface of the back wall.

12. The case according to claim 1, wherein the one or more items are selected from the group consisting of: credit card(s), identification card(s), key(s), currency, earpiece, headphones, computer chips, and memory cards.

13. The case according to claim 1, wherein the reinforcement material comprises a polypropylene material and the resilient band comprises a thermoplastic polymer material.

14. The case according to claim 1, wherein the resilient band further comprises a body portion extending adjacent to the back wall of the body, the body portion being connected to a bottom and sides of the base, and having an inner surface constructed and arranged to move towards and away from the back wall thereby forming a pocket to receive and hold the one or more items against the case.

15. An attachment device for a portable electronic device having a screen, the attachment device comprising:
    a base comprising a body having a back wall and side walls extending therefrom forming a receiving opening for receiving the electronic device;
    a top having at least a front wall that is configured to releasably lock with the base to encapsulate the electronic device therein; and
    a resilient band attached to the body and configured to hold one or more items against the case, wherein the resilient band has a first end and a second end for connection to the body, each end comprising a reinforcement portion comprising a material that is different from a material of the first and second ends, and wherein each end is connected to one relative side wall of the body such that the band extends adjacent to the back wall of the body, and
    wherein the side walls comprise male protrusion members and wherein the first and second ends of the resilient band comprise female receiving members, and wherein the female receiving members of the first and second ends of the resilient band are attached to the male protrusion members of the side walls of the body.

16. The attachment device according to claim 15, wherein the resilient band further comprises an inner surface and an outer surface, and wherein the inner surface of the resilient band is constructed and arranged to lie adjacent an outer surface of the back wall, and wherein the items are configured to be held between the inner surface of the resilient band and the outer surface of the back wall.

17. The attachment device according to claim 16, wherein the outer surface of the back wall of the body comprises an indentation configured to receive the resilient band therein.

18. The case according to claim 17, wherein the indentation is configured such that the outer surface of the resilient band is constructed and arranged to lie substantially flush with the outer surface of the back wall of the base.

19. The case according to claim 16, further comprising a recessed grasp area provided adjacent the resilient band to enable access to grasp the resilient band for movement of the inner surface of the band away from the outer surface of the back wall.

20. The attachment device according to claim 15, wherein the one or more items are selected from the following group: credit card(s), identification card(s), key(s), and cash.

21. The attachment according to claim 15, wherein the resilient band extends a width of the case in a lateral direction.

22. The attachment according to claim 15, wherein the resilient band extends the length of the case in a longitudinal direction.

23. The attachment according to claim 15, wherein the resilient band is attached such that it extends in a diagonal direction with respect to the case.

24. The attachment device according to claim 15, wherein each end comprises a polypropylene material and wherein the resilient band is formed from a thermoplastic polyethylene (TPE).

25. The attachment device according to claim 15, wherein the resilient band further comprises a body portion extending adjacent to the back wall of the body, the body portion being connected to a bottom and sides of the base, and having an inner surface constructed and arranged to move towards and away from the back wall thereby forming a pocket to receive and hold the one or more items against the case.

* * * * *